(12) United States Patent
Mavroidis

(10) Patent No.: US 10,637,780 B2
(45) Date of Patent: Apr. 28, 2020

(54) MULTIPLE DATASTREAMS PROCESSING BY FRAGMENT-BASED TIMESLICING

(71) Applicant: MACOM Connectivity Solutions, LLC, Lowell, MA (US)

(72) Inventor: Dimitri Mavroidis, Chania (GR)

(73) Assignee: MACOM Connectivity Solutions, LLC, Lowell, MA (US)

(*) Notice: Subject to any disclaimer, the term of this patent is extended or adjusted under 35 U.S.C. 154(b) by 210 days.

(21) Appl. No.: 15/863,585

(22) Filed: Jan. 5, 2018

(65) Prior Publication Data

US 2018/0198713 A1    Jul. 12, 2018

Related U.S. Application Data

(63) Continuation of application No. 14/090,610, filed on Nov. 26, 2013, now Pat. No. 9,893,999.

(51) Int. Cl.
  *G06F 9/46*  (2006.01)
  *H04L 12/801*  (2013.01)
(52) U.S. Cl.
  CPC .................... *H04L 47/10* (2013.01)
(58) Field of Classification Search
  CPC ........................................... H04L 47/10
  See application file for complete search history.

(56) References Cited

U.S. PATENT DOCUMENTS

| | | | |
|---|---|---|---|
| 4,262,357 A * | 4/1981 | Shima | H04J 3/245 370/462 |
| 5,809,147 A | 9/1998 | De Lange et al. | |
| 7,093,204 B2 | 8/2006 | Oktem et al. | |
| 7,200,822 B1 | 4/2007 | McElvain | |
| 7,640,519 B2 | 12/2009 | Oktem et al. | |
| 7,765,506 B2 | 7/2010 | Oktem et al. | |
| 7,823,162 B1 | 10/2010 | Keller et al. | |
| 8,122,006 B2 | 2/2012 | De Castro Alves et al. | |
| 8,141,024 B2 | 3/2012 | Markov et al. | |
| 8,161,437 B2 | 4/2012 | Oktem et al. | |
| 8,320,285 B2 | 11/2012 | Kitani | |
| 8,397,195 B2 | 3/2013 | Erickson | |
| 8,418,104 B2 | 4/2013 | Oktem et al. | |
| 2003/0161610 A1* | 8/2003 | Miyazawa | H04N 7/17336 386/244 |
| 2004/0199878 A1 | 10/2004 | Oktem et al. | |
| 2006/0217949 A1 | 9/2006 | Chidhambarakrishnan | |
| 2006/0265685 A1 | 11/2006 | Oktem et al. | |
| 2007/0036022 A1 | 2/2007 | Song | |
| 2007/0121499 A1 | 5/2007 | Pal et al. | |
| 2007/0174794 A1 | 7/2007 | Oktem et al. | |
| 2009/0180494 A1 | 7/2009 | Ren et al. | |
| 2010/0054386 A1 | 3/2010 | Abel et al. | |

(Continued)

*Primary Examiner* — Camquy Truong

(57) ABSTRACT

Systems and methods for multi-channel signal processing by virtue of packet-based time-slicing with single processing core logic. The processing core logic is configured to receive data streams from the multiple communication channels at a data processing unit, and process data fragments of the data streams in a time-sliced manner. The processing core logic can switch from processing a first data fragment of a first data stream to processing a first data fragment of a second data stream at an end of a time slice, wherein the time slice is determined by a fragment boundary associated with the data fragment of the first data stream.

20 Claims, 6 Drawing Sheets

(56) References Cited

U.S. PATENT DOCUMENTS

2010/0058261 A1   3/2010  Markov et al.
2010/0058278 A1   3/2010  Oktem et al.
2010/0091770 A1   4/2010  Ishikawa
2010/0287522 A1  11/2010  Oktem et al.
2011/0184717 A1   7/2011  Erickson
2012/0174053 A1   7/2012  Markov et al.

* cited by examiner

MULTIPLE DATASTREAMS PROCESSING BY FRAGMENT-BASED TIMESLICING

CROSS-REFERENCES

This application is a continuation application of the U.S. Patent Application titled "MULTIPLE DATASTREAMS PROCESSING BY FRAGMENT-BASED TIMESLICING," filed on Nov. 26, 2013 and Ser. No. 14/090,610, now U.S. Pat. No. 9,893,999, which is related to the commonly assigned U.S. patent application titled "METHOD FOR CONVERTING A SINGLE CHANNEL HARDWARE MODULE INTO A MULTI-CHANNEL MODULE," filed on Feb. 7, 2012 and Ser. No. 13/367,753, now U.S. Pat. No. 8,607,181. The foregoing patent applications are herein incorporated by reference for all purposes.

TECHNICAL FIELD

The present disclosure relates generally to the field of signal processing, and, more specifically, to the field of multi-channel signal processing.

BACKGROUND

A single-channel design refers to a synchronous digital design that processes a continuous stream of data all of the same channel. For example, the design may receive a word of data in each clock cycle, with the exception of "disabled" cycles which are cycles in which the design receives no data. Architect circuits that process independent data streams from multiple channels typically use a single, common register transfer level (RTL) core design with modifications from a corresponding single-channel design.

A time-sliced logic design is often used to process data from multiple channels, where a subset of the processing cycles is assigned to each channel. Internally a common design core is shared by all channels, which keeps switching state every time a new channel's data comes in, which can happen as often as once per clock cycle for example.

A conventional time-sliced logic design is usually cycle-based, which statically allocates a specific, repeated subset of an N-cycle period to each channel. For example, the logic may be capable of switching from channel X to channel Y at each clock cycle; sometimes X will be the same as Y.

For example, a cycle-based time-sliced logic that receives data for channel X at cycle C at its input, can produce data for channel X at its output at cycle (C+M), where M is a constant and for the rest of this description, e.g., M=1. The produced data will be a processed version of the data that was received for channel X at cycle (C−L), where L is the latency of the original single-channel design. In that sense, the cycle-based time-sliced design can preserve the latency of the single-channel design.

For example assume a 3-channel time-sliced design whose channels are allocated with bandwidths equal to 48%, 24%, 22% of the total bandwidth respectively, with 6% of the maximum potential bandwidth remaining unused. Out of every N=4 clock, this logic can allocate 2 cycles to the 1st channel and 1 cycle to each of the other two channels. In a total of 100(=25×4) cycle periods, channel #1 gets a total of two disabled cycles, channel #2 gets one disabled cycle and channel #3 gets three disabled cycles. The disabled cycles can appear anywhere in the 100-cycle period. In order to switch from channel X to channel Y, the logic needs to save the current value of each register (its "state") for channel X in some internal memory, and load the last saved state of channel Y. In other words, the logic needs to perform a context switch to switch channel. The state includes the values of all registers in the logic, and has to be maintained in some form of internal memory, which can potentially become quite large. Unfortunately, this implies that the logic needs to include enough memory to simultaneously hold the states of all channels that it processes. The demand for a large memory often makes it counter-productive to timeslice a design, especially if the number of channels is low, e.g., less than 4. In that case, it would be often more area efficient to simply replicate the design N times, once for each channel. Therefore, it would be advantageous to reduce or eliminate the need for saving and reloading the states during context switching.

SUMMARY OF THE INVENTION

Accordingly, embodiments of the present disclosure employ a packet-based timeslicing approach to process data from multiple channels by use of single-processing core logic. The processing core logic is configured to processes an entire fragment of data, or a data unit, e.g., a packet or a frame, before context switching to the nest channel. Each data fragment may comprise a plurality of words and a fragment boundary. Processing a data fragment at the processing logic is relatively autonomous and mostly independent of processing other data fragments. Thus, the core logic only needs to save a reduced number of registers to be utilized to process the subsequent fragments. Advantageously, it does not need to save the state, e.g., the values of any registers that are used during the processing of the fragment but whose values are not used for the next fragment. Therefore, the gate area and the memory consumption, and the design complexity of the processing core logic can be advantageously reduced to a significant degree.

In one embodiment of the present disclosure, a method of processing data transmitted from multiple communication channels comprises: (1) receiving a plurality of data streams at a data processing unit, wherein each data stream comprises a sequence of data fragments, and wherein each data fragment is associated with a fragment boundary; and (2) processing, by the data processing unit, a data fragment from a first data stream and, at the end of a time slice, processing a data fragment from a second data stream, wherein the time slice is determined by a fragment boundary associated with the data fragment from the first data stream.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
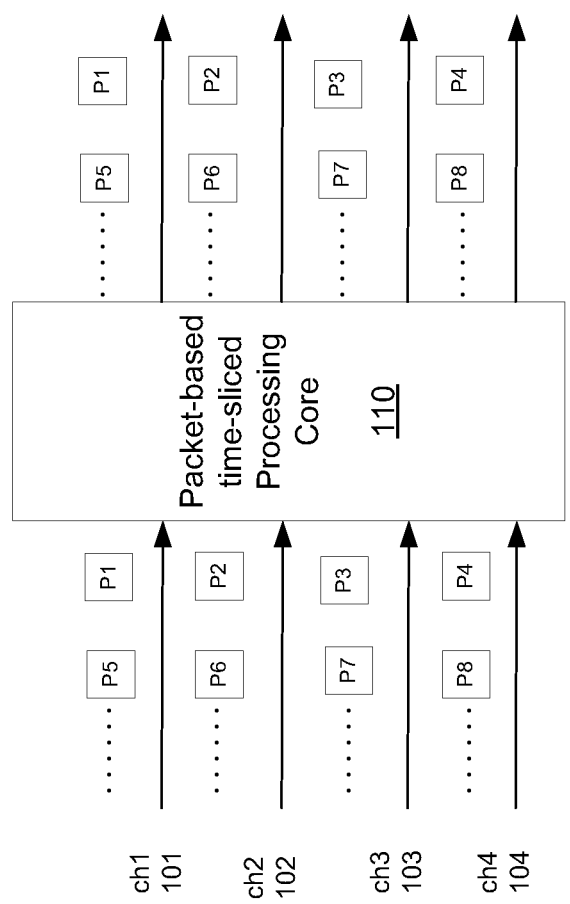
FIG. 1 is a diagram illustrating an exemplary packet-based time-slicing process used in multi-channel data processing by a single processing core in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer/system's registers and memories and other computer readable media into other data similarly represented as physical quantities within the computer system memories or registers or other such information storage, transmission, or display devices. When a component appears in several embodiments, the use of the same reference numeral signifies that the component is the same component as illustrated in the original embodiment.

Multiple Datastream Processing by Fragment-Based Timeslicing

FIG. 1 is a diagram illustrating an exemplary packet-based time-slicing process used in multi-channel data processing by a single processing core in accordance with an embodiment of the present disclosure. As illustrated, four data streams, 101-104, from respective four channels, ch1, ch2, ch3, and ch4, are provided to an input of the common processing core 110 in sequence. The packets in the streams may be provided in sequence, one after another, to the single-channel processing core 110, and processed in sequence by this core. In some embodiments, the data streams are independent of each other. Each data stream includes a sequence of data fragments, or data units, e.g., packets. According to the present disclosure, during a time slice, the processing core 110 operates to continuously process an entire full data packet without any context switch in an assigned time slice. Because a particular packet can be processed fully in a continuous time slice, the processing core 110 need not maintain the values of the registers, e.g., the state of a channel, that are only related to the particular packet while immaterial to processing subsequent packets of the same, or a different, channel. Thus only one copy of these states needs to exist in the processing core. Rather, the processing logic only needs to preserve the states to be utilized to process the subsequent packets. This can advantageously reduce memory consumption to a significant extent because all or a substantial portion of the registers of a processing core does not need to be saved during a context switch.

At a predefined boundary of a packet, the processing core 110 can then switch to process the next incoming packet in accordance with a predetermined order. As will be appreciated by those skilled in the art, the present disclosure is not limited to any specific processing order with respect to the channels. In some embodiments, the processing core can process packets from the four streams in a Round-robin manner, or based on the priorities of the channels, or in a random order. In some other embodiments, the processing core may process more than one packet of the same channel in consecutive time slices. Further, in some embodiments, although the processing core conceptually processes one packet at a time, in implementation the data packets of multiple channels may be received and processed in a pipelined manner, which is well known in the art. In some embodiments, receiving and processing with respect to a packet may be performed in sequence.

In some embodiments, the processing core need not save any state at all between the processing of consecutive packets, where the processing core can be treated similarly as a single-channel design. As such, the processing core logic processes one packet at a time in a pipelined manner just like it did in single-channel mode, completely ignoring the fact that each packet may belong to a different channel. This can advantageously and greatly reduce the complexity of the time-sliced design.

Although embodiments described in the present disclosure frequently refer to a packet as a data fragment that can be processed in a particular time slice, as will be appreciated by those skilled in the art, the present disclosure is not limited to any specific definition of a data fragment and the fragment boundary. In some embodiments, the data fragment boundaries may be contained in the fragment as a special sequence of bits, bytes, or a word, e.g., a header. In some other embodiments, a boundary may be identified based on the predetermined lengths of data. In some embodiments, the data fragments processed by a single processing core may comprise varying lengths. In some other embodiments, the data fragments are of equal lengths and accordingly each time slice can span the same duration.

For example, a packet-based time-sliced processing logic in accordance with the present disclosure can be applied to calculate a Forward Error Correction (FEC) parity for a sequence of Optical Transport Network (OTN) frames in a pipelined manner. It can be assumed that the FEC parity of an OTN frame is a function of the data of this frame only and not of any data in prior or subsequent frames. The processing core can receive at its input an entire OTN frame of channel X, followed by an entire OTN frame of channel Y, and be oblivious to the fact that these frames belong to different channels. The FEC parity of each frame can be calculated using a single copy of any number of internal registers, without the need to save or load any state. This is because each frame is autonomous in the sense that its parity calculation does not depend in any way on the contents of prior frames. In this example, a data fragment corresponds to one OTN frame.

Figure 2:
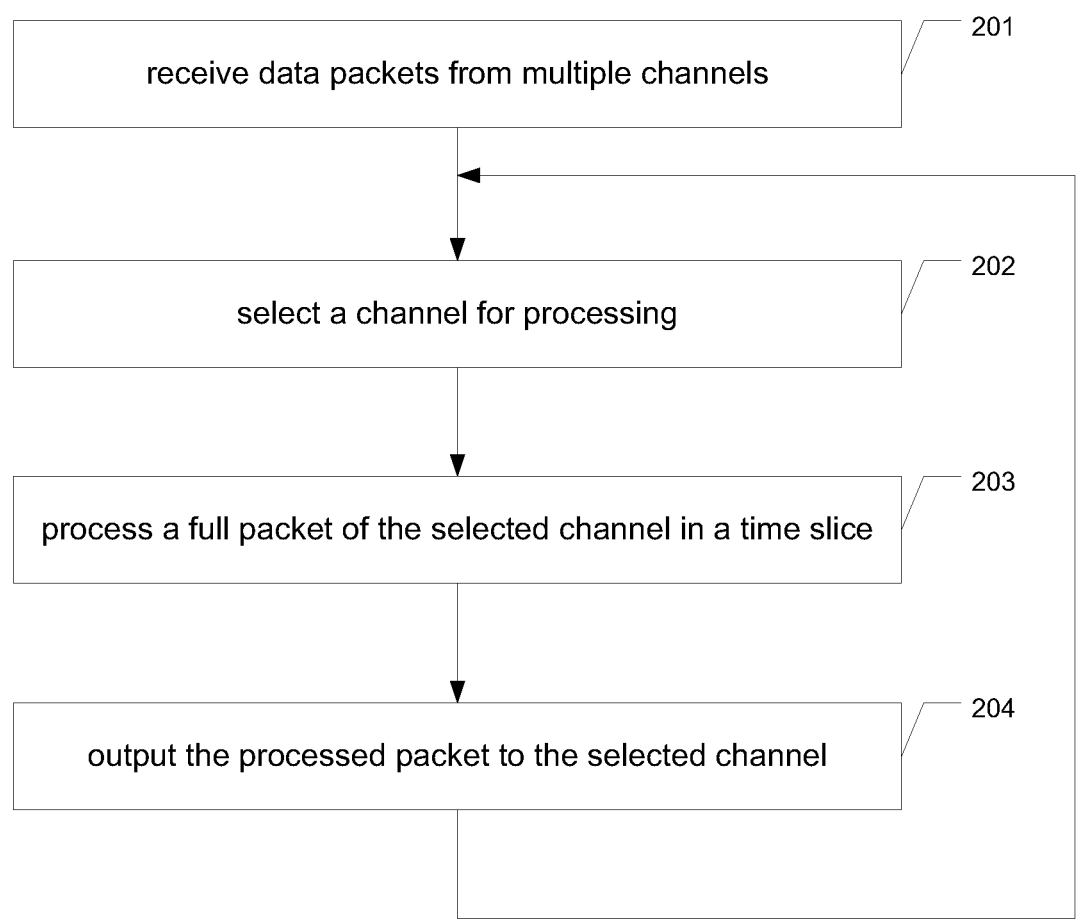
FIG. 2 is a flow chart illustrating an exemplary method of processing multi-channel data using single processing core logic by virtue of packet-based timeslicing in according with an embodiment of the present disclosure.

FIG. 2 is a flow chart illustrating an exemplary method of processing multi-channel data using a single processing core logic by virtue of packet-based timeslicing in according with an embodiment of the present disclosure. At 201, data packets from multiple channels are received at the processing core logic. The multiple channels may be related to or independent of each other. In each time slice, the processing core selects a channel for processing at 202, such as based on a Round-robin scheduling. At 203, a full packet of the selected channel is processed in the time slice without context switch. At 204, the processed packet is output to the downstream of the channel.

A single-channel data processing logic that has been developed can be converted to a multi-channel data processing logic by time-slicing the multiple channels. In some applications, a single-channel design can be converted to a cycle-based time-sliced one that internally incorporates a packet-based time-sliced core. Buffers can be used to adapt the data streams from a cycle-based time-slicing to a packet-based time slicing and vice versa. One such buffer will be added for each channel that needs to be processed. Each buffer may contain a single FIFO for example.

Figure 3:
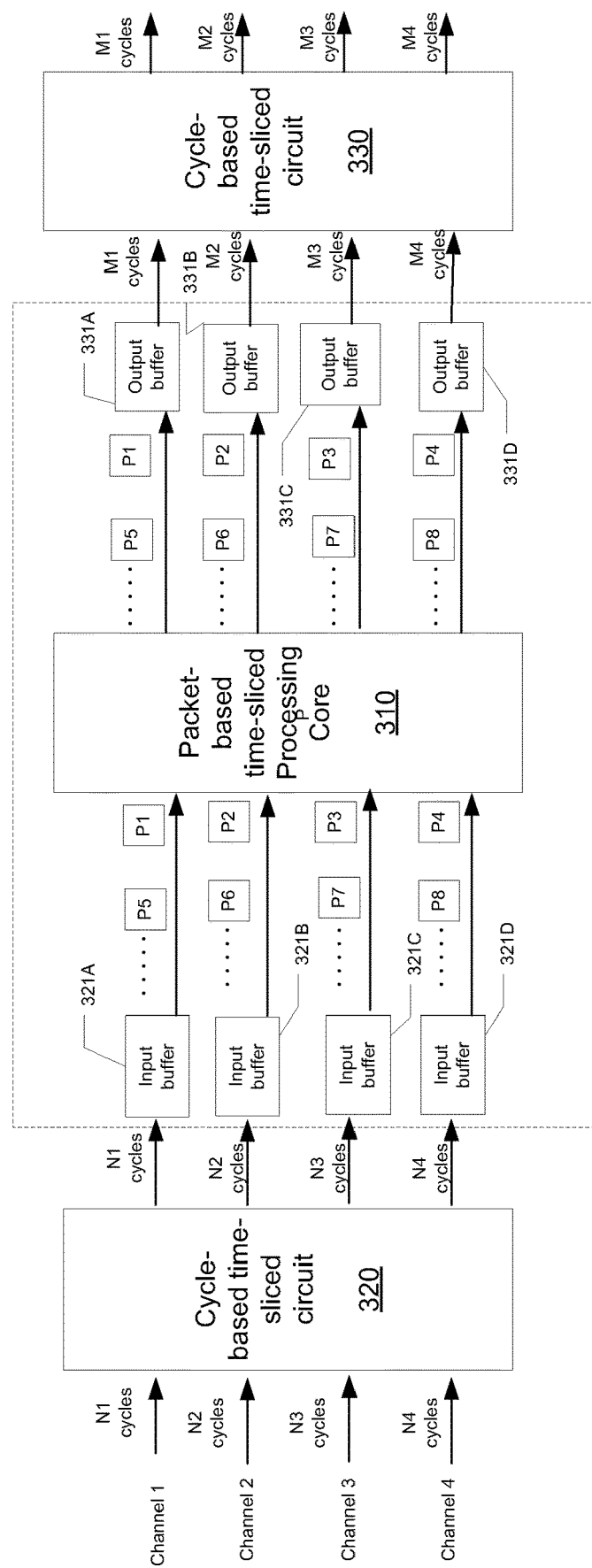
FIG. 3 is a diagram illustrating exemplary data processing circuitry comprising a packet-based time-sliced processing core interfaced with two cycle-based time-sliced segments.

FIG. 3 is a diagram illustrating exemplary data processing circuitry comprising a packet-based time-sliced processing core 310 interfaced with two cycle-based time sliced cores 320 and 330. Input buffers 321A-321D are coupled between the upstream cycle-based time-sliced logic 320 and the packet-based time-sliced logic 310. Output buffers 331A-331D are coupled between the downstream cycle-based time-sliced logic 330 and the packet-based time-sliced logic 310.

At the input of the cycle-based time-sliced logic 320, each channel at the top-level input/output ports is statically allocated a constant number of cycles out of each period of N total cycles, depending on its bandwidth or data transmission speed. In this example, it can be assumed that each of the four channels is allocated one cycle for each four cycle repeated period, e.g., N1=N2=N3=N4=1. As will be appreciated by those skilled in the art, extending the techniques described here to scenarios where a channel is allocated more than one cycle is within the scope of one of ordinary skill in the art.

In this example, it is assumed that the time-sliced, design receives one data word at each clock cycle, along with a channel ID which associates this data word with a particular channel, and an 'enable' signal which marks the word as valid or invalid, e.g., 'enabled' or 'disabled' word. At the output of the cycle-based time-sliced logic 320, it produces again one data word per clock cycle, associated with a channel ID and an output enable signal. Fine tuning of the bandwidth of each channel is done through the 'enable' signal.

The packet-based time-sliced logic 310 can then read data from the input buffers in accordance with the packet-based time-sliced schedule and thus read one packet at a time. In some embodiment, if there is less than a full packet available for the logic 310 to read, the buffer may need to produce a null packet, or a bubble packet, to maintain the correct bandwidth allocation between the channels. The packet-based time-sliced logic 310 generates processed data packets, e.g., P1, P2, . . . , that are ten buffered at the output buffers 331A-331D. The downstream cycle-based time-sliced logic can read data from the output buffers 331A-331D in accordance with a cycle-based time-sliced schedule. For example, M1, M2, M3 and M4 cycles are allocated to the four channels respectively. In some embodiments, the N1 is equal to M1, and N2 is equal to M2, etc.

Typically, there can be a one-to-one association with each input data word to each output data word; the number of enabled output words for each channel matches the number of enabled input data words for each channel. In other words the output data words will be a processed version of the input data words.

In some embodiments, each buffer contains a single FIFO. Each time valid data is received for channel X, this data can be written to the FIFO of buffer X. Only valid data can be written to each buffer. If disabled cycles are received, the corresponding data will not be written to any buffer. This means that disabled cycles are terminated at the input packet buffers.

Assuming that the number of cycles allocated to each channel is the same, one full packet will be read from each buffer FIFO, before going to the next buffer in a round-robin order. If there is not enough data in a buffer in order to read one full packet from it, the design will instead produce a 'bubble' packet for that channel, as will be described in greater detail below. During the time that the bubble packet is produced, the buffers will not be read.

Assuming that a different number of cycles is allocated to each channel out of each N cycle period, then a number of packets proportional to the number of cycles allocated to channel X will be read from the FIFO of channel X before going to the next buffer based on a predetermined order. For example, the predetermined order can be a round robin order, e.g., in the sequence of channel 1, 2, . . . , N, 1, 2 . . . If at any point in time a packet needs to be read from a certain buffer but there isn't enough data in the buffer to read a full packet without causing FIFO underflow, a bubble packet will be produced instead as described below.

In some embodiments, the read and write processes are completely independent of each other, which may simplify the circuit design. The actual bandwidth of each channel, including the disabled cycles, may be transparent to a circuit design process according to the present disclosure. Only the static, total number of cycles allocated to that channel, enabled or not, over the N-cycle period is used for design purposes. Further, in some embodiments, the buffers only store valid data for each channel, which can effectively reduce their required capacity.

Increasing or decreasing the percentage of disabled cycles in one channel may not affect the other channels. It only affects the percentage of bubble packets that will be generated for that particular channel. The percentage of bubble packets may be equal to the percentage of disabled cycles.

The output packet buffers at the output of the packet-based core can adapt the packet-based round-robin output data to cycle-based round-robin time-sliced data. The use of output buffers depends on the specifications of the top-level block, and whether they are needed to produce cycle-based round-robin time-sliced data at its output. The output buffers can work similarly with the input buffers; again only valid data is stored, and data is read at the output proportionally to the number of cycles allocated to each channel.

The output controller can statically allocate the pre-specified number of cycles to each channel. Each cycle is allocated to the corresponding channel independently of data availability. Depending on the availability of data, an enabled or disabled output cycle will be produced for that channel. If the downstream cycle-based time-sliced logic attempts to read a data word from an output buffer and a word is not available, the logic will produce a single disabled cycle at the output and then go to the next channel.

Figure 4:
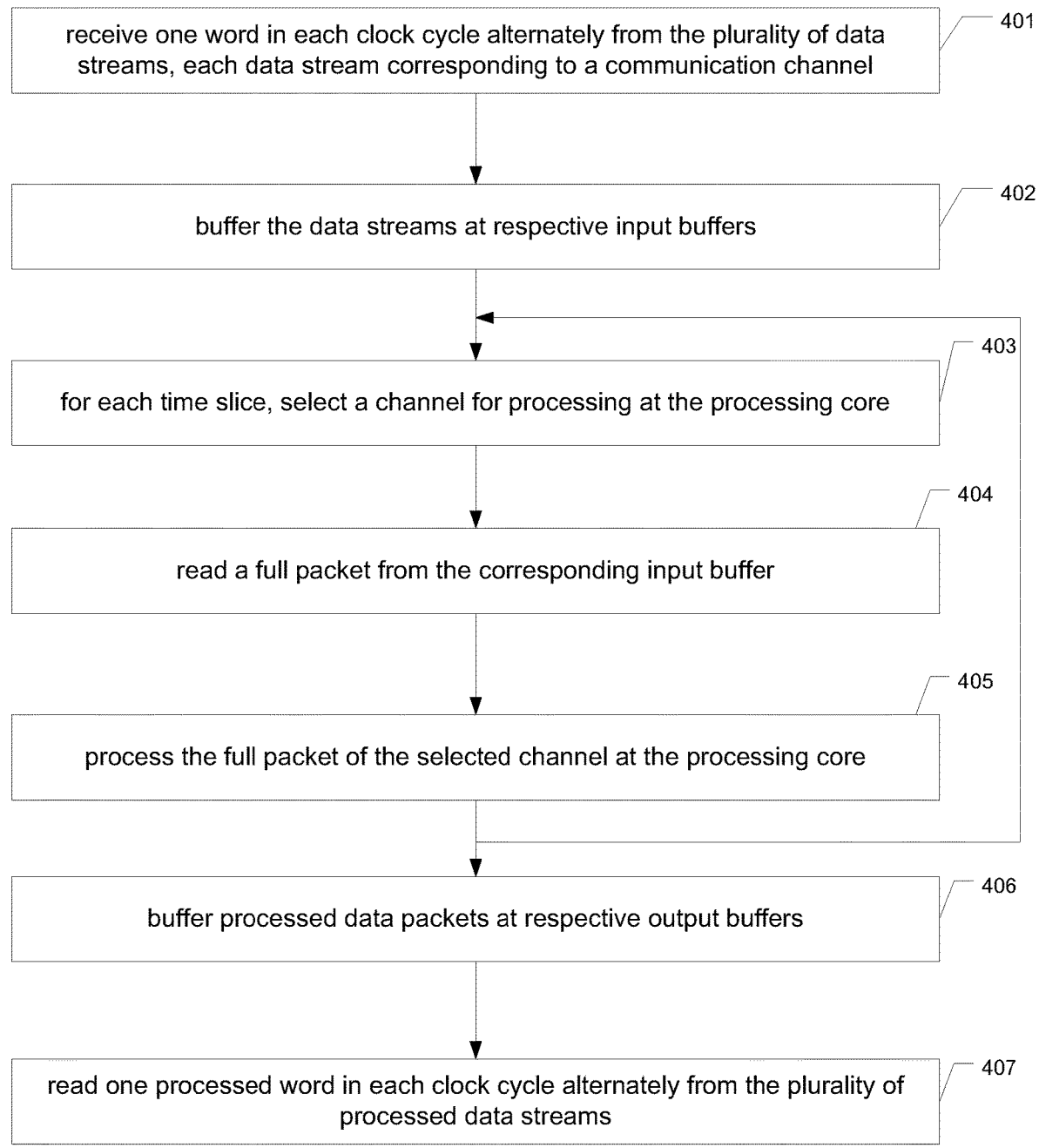
FIG. 4 is a flow chart which illustrates an exemplary method of interfacing a cycle-based time-sliced logic with a packet-based time-sliced logic by virtue of data buffering.

FIG. 4 is a flow chart which illustrates an exemplary method 400 of interfacing a cycle-based time-sliced logic with a packet-based time-sliced logic by virtue of data buffering. At 401, the respective data streams from multiple channels are received, with one word received in each clock cycle from the multiple streams. The data streams are buffered at the input buffers at 402.

For each time slice, at 403, a channel is selected for processing at the packet-based time-sliced processing core. A full packet is read from the corresponding input buffer at 404, and processed at the processing core at 405. Steps 403-403 can be repeated for each time slice.

At 406, the processed data packets are buffered at the output buffers at 406. At 407, in each clock cycle, one processed word is read from the plurality of processed data streams.

In some applications, all channels are allocated with the same bandwidth. For example, each channel of the N channels can be allocated exactly one cycle in an N cycle period. If all input data is enabled (the 'enable' input is always 1), which means that at every clock cycle, one enabled word is received from the channel that owns this cycle, then it can safely be expected that as soon as channel X contains one full packet in its input packet buffer, all channels will also contain one fell packet in their corresponding buffers.

However, in some applications, the channels are allocated with different bandwidth if some cycles contain disabled data at the input (enable=0), which means that the effective bandwidth of each channel will be different. In this case, once the processing logic moves from channel X to channel Y, it may not find one full packet in buffer Y, and will underflow the buffer if it attempts to read one full packet from it.

Bubble packets or null packets can be used to address the underflow problem. When the processing moves on to the next channel in the round-robin order, and finds that there is not enough data to send a full packet to the packet-based processing engine, it will instead send one full packet of "bubble" data—for example a packet filled with 00's. The circuit that reads the input packet buffers can stay on each buffer for P cycles, where P is the number of cycles needed to transmit one full packet, regardless if a packet is available in that buffer or not. During those P cycles, the reading circuit will either read one full packet from the buffer, or it will produce one full bubble packet without reading the buffer at all. In some embodiments, the decision as to whether a bubble packet will be produced will be made based on the FIFO level, of that buffer at the start of the P cycle period.

With this approach a buffer can advantageously reduce or avoid underflow. The overflow condition can also easily be reduced or avoided by choosing an appropriate size for the buffer; for example: this size is about equal to two packets. As a result, the effective bandwidth for each channel can be preserved. This approach allows incoming disabled cycles to be converted to bubble packet without the need to do any bandwidth calculations or counting of disabled cycles.

This approach can be extended in a case that there are channels which are not allocated one cycle each. For example, take a three channel data processing circuit, and out of a period of N=4 cycles total, 2 cycles are allocated to the 1st channel and 1 cycle allocated to each of the other 2 channels. Assume that a full packet is transmitted in P=100 cycles for a single channel. In that case 3 input packet buffers can be used, one for each of the 3 channels. For each channel X=0 . . . 2, the circuit writes all valid data for channel X to buffer X. It will also read 2 packets from buffer 0, then 1 packet from buffer 1 and then 1 packet from buffer 2, and then will go back to read 2 packets from buffer 0 and so on. If at some point the circuit tries for example to read two packets from buffer 0 and there is only one packet available, the circuit will read that one packet and it will then stop reading buffer 0. For the next P=100 cycles, a bubble packet can be generated for channel 0, not reading any buffer during that time. So the circuit can consume a total of 2*P=200 cycles producing data for channel 0, regardless if this data is read from buffer 0 or is "filled in" with bubble cycles. This way, channels 1 and 2 can be allocated with 100 cycles each in every 400 cycles total, regardless of the number of bubble packets that is produced for channel 0.

A "bubble flag" bit can be associated with a packet and that travels along with each word of data, signifying this word as an extra word that belongs to a "bubble packet". All data belonging to "bubble packets" can be dropped at the output of the packet-based time-sliced core, and will not be written to the output packet buffers mentioned earlier as it is not valid data. The processing core can identify the bubble packets using the bubble flag attached to each bubble data word.

Figure 5:
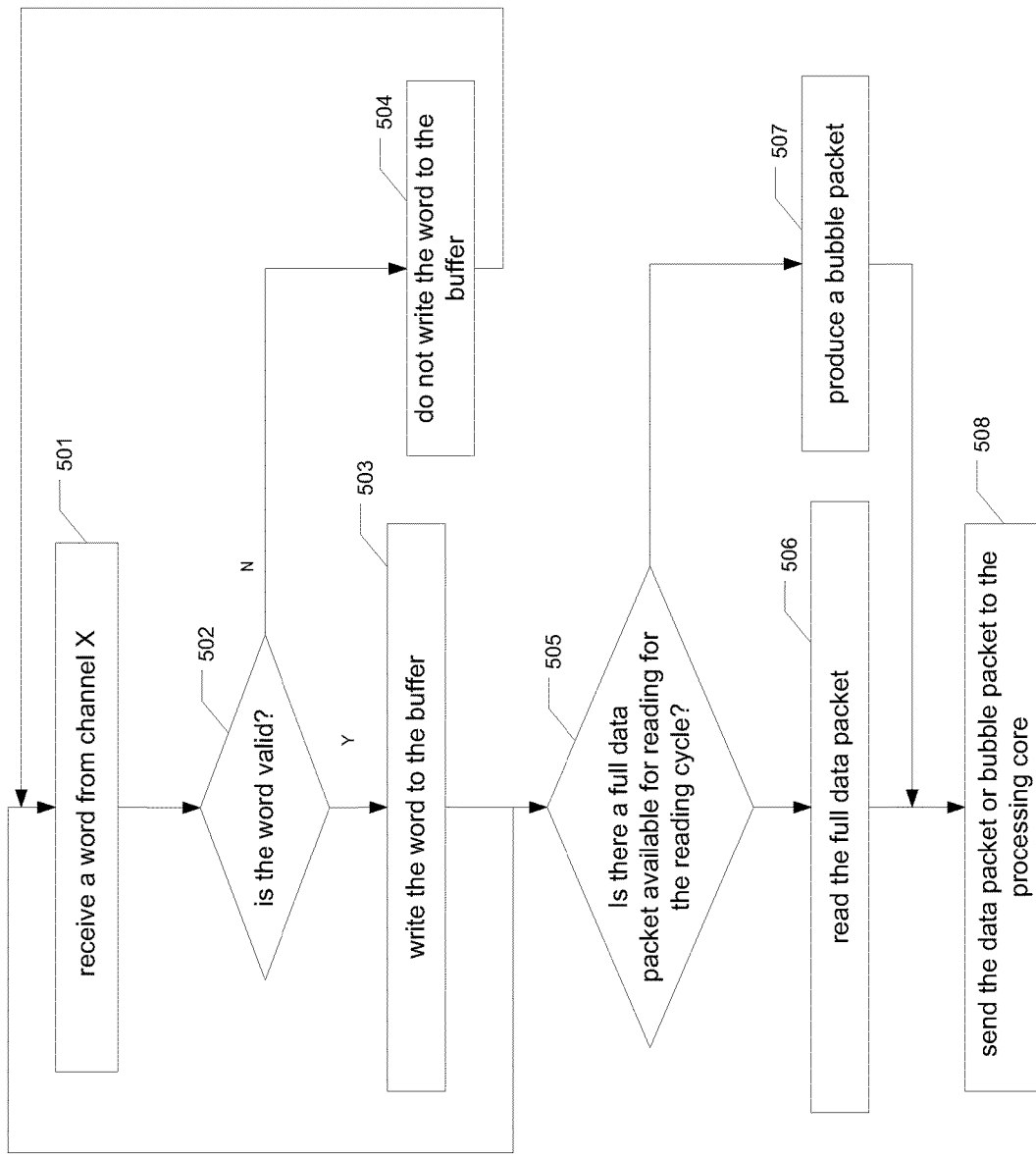
FIG. 5 is a flow chart illustrating an exemplary process of buffering data at an input buffer interfacing a cycle-based time-sliced logic and a packet-based time-sliced logic in accordance with an embodiment of the present disclosure.

FIG. 5 is a flow chart illustrating an exemplary process of buffering data at an input buffer interfacing a cycle-based time-sliced logic and a packet-based time-sliced logic in accordance with an embodiment of the present disclosure. At 501, in each clock cycle, a word is received from channel X. If the word is determined to be valid at 502, it is written to the buffer during a writing cycle at 503. If the word is invalid, the word is not written to the buffer and so terminated at 504. The foregoing 501-503 are repeated for each clock cycle at the input of the input buffer.

During a reading cycle, if it is determined at 505 that a full data packet is available for reading and processing by the packet-based time-sliced logic, the full data packet is read at 506 and sent to the packet-based time-sliced logic at 508. On the other hand, if a full data packet is unavailable at 505, a bubble packet is produced and a corresponding bubble indication is attached to the packet at 507. The bubble packet is sent to the packet-based time-sliced logic at 508.

Figure 6:
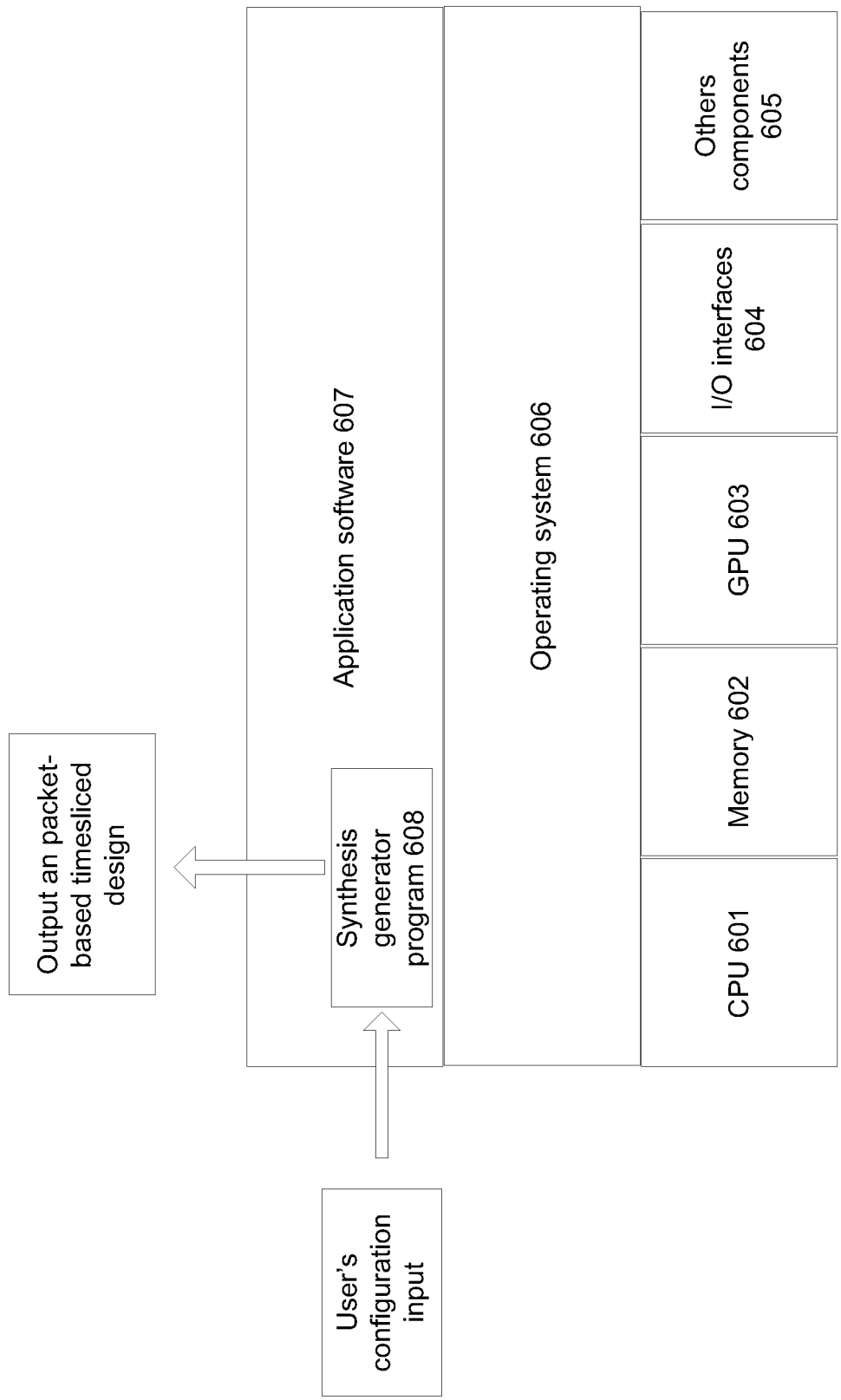
FIG. 6 illustrates a block diagram of a computing system including a synthesizable code generator in accordance with an embodiment of the present disclosure.

The packet-based time-sliced processing logic as well as associated circuitry disclosed herein can be produced automatically by a synthesizable code generator, such as VHDL, Verilog, or other hardware description languages known to those skilled in the art. FIG. 6 illustrates a block diagram of a computing system including a synthesizable code generator in accordance with an embodiment of the present disclosure. The computing system comprises a processor 601, a system memory 602, a GPU 603, I/O interfaces 604 and other components 605, an operating system 606 and application software 607 including a synthesis generator program 608 stored in the memory 602. When incorporating the user's configuration input and executed by the processor 601, the generator program 608 the packet-based time-sliced processing logic produces a synthesizable code representing a packet-based time-sliced processing logic. The synthesizable code may be combined with other code, either produced by a generator program or authored by a programmer. Synthesizable code may be written in Verilog, VHDL, or other hardware description languages known to those skilled in the art.

The generator program comprises components that are used to produce corresponding components of synthesizable code, such as input buffer code generator, a packet-based time-sliced processing logic code generator, a cycle-based time-sliced processing logic code generator, and an output interface code generator.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of processing multiple data streams, said method comprising:
   receiving a plurality of data streams at a data processing unit, wherein each data stream comprises a sequence of data fragments, and wherein each data fragment in said data stream is associated with a fragment boundary and is carried in said data stream consecutively;
   said data processing unit continuously processing a first data fragment in entirety from a first data stream;
   at an end of a time slice, said data processing unit transitioning to continuously processing in entirety a second data fragment from a second data stream, wherein said time slice is determined by a fragment boundary associated with said first data fragment from said first data stream; and
   outputting processed data fragments from said data processing unit in output streams, wherein each processed data segment is carried in an output stream consecutively, wherein: said processed data fragment comprises a plurality of processed words; each processed word corresponds to an input word in a corresponding data fragment; and each input word is associated with a channel identification and validity signals indicating validity of said input word, wherein each data fragment comprises a plurality of input words.

2. The method of claim 1 further comprising identifying said fragment boundary from said first data stream.

3. The method of claim 1 further comprising said data processing unit continuously processing a third data segment in entirety from said first data stream, wherein said third data segment is processed independently of said data processing unit processing said first data fragment, wherein said third data fragment is comprised in said first data stream and succeeds said first data fragment in said first data stream.

4. The method of claim 1 further comprises selecting said second data stream from said plurality of data streams for processing in accordance with a predetermined order.

5. The method of claim 1, wherein said first data fragment corresponds to a data packet, and wherein said fragment boundary corresponds to an end of said data packet.

6. The method of claim 1 further comprising buffering said plurality of data streams at input buffers of said data processing unit, wherein said buffering comprises:
   storing valid data in data fragments in said input buffers based on validity signals associated with said valid data; and
   rejecting invalid data in data fragments in said input buffers based on validity signals associated with said invalid data.

7. The method of claim 6, wherein said plurality of data streams are transmitted by multiple communication channels of different bandwidths, and wherein said buffering said data streams further comprises:
   generating a bubble fragment upon a determination that less than a data fragment is available during said reading at an input buffer; and
   associating a bubble flag with said bubble fragment.

8. The method of claim 7, wherein said bubble fragment is generated in response to one or more invalid words received at said input buffer, wherein said bubble fragment comprises zeros only, and further comprising rejecting said bubble fragment at an output of said data processing unit.

9. The method of claim 6 further comprising buffering processed data fragments at output buffers of said data processing unit, wherein said buffering of said processed data streams comprises reading processed data fragments from said output buffers in a cycle-based time-sliced manner.

10. A device comprising processing logic circuitry for processing data from multiple channels, comprising:
    logic circuitry configured to receive streams of data from said multiple channels, wherein each stream is transmitted through a respective channel, wherein each stream comprises a respective sequence of packet data units, and wherein each packet data unit is associated with a predefined boundary that defines a boundary between said packet data unit and another packet data unit, wherein each packet data unit is carried in said stream consecutively; and
    logic circuitry configured to process said streams in a first time-sliced schedule, wherein a respective time slice of said first time-sliced schedule is allocated to continuously process a respective packet data unit in entirety based on a predefined boundary associated with said respective packet data unit.

11. The method of claim 1, wherein said plurality of data streams are transmitted by multiple communication channels of different bandwidths.

12. The device of claim 10, wherein said processing logic circuitry further comprises:
    logic circuitry configured to process consecutive packet data units of a same stream in two respective time slices without context switching;
    logic circuitry configured to process a stream from said streams for processing; and logic circuitry configured to generate respective processed streams in response to said streams, wherein each processed packet data is carried in a respective processed stream consecutively.

13. The device of claim 10, wherein packet data units of said streams comprise words, and wherein each word is associated with a flag indicating validity of said word.

14. The device of claim 10 further comprising:
upstream logic circuitry coupled to an input of said processing logic circuitry, wherein said upstream logic circuitry is configured to output said streams in a second time-sliced schedule, wherein each time slice of said second time-sliced schedule comprises a respective predetermined number of clock cycles allocated to a corresponding data stream; and
a plurality of input buffers coupled between said upstream logic circuitry and said processing logic circuitry, wherein each input buffer is configured to:
store valid words in packet data units of a respective data stream; and
reject invalid words in packet data units of said respective data stream;
wherein said processing logic circuitry is configured to read packet data units from said input buffers in accordance with said first time-sliced schedule.

15. The device of claim 14, wherein each input buffer is further configured to generate a null packet upon a determination that a full packet data unit is unavailable for reading by said processing logic circuitry in a corresponding time slice.

16. The device of claim 10 further comprising:
down-stream logic circuitry coupled to an output of said processing logic circuitry, wherein said down-stream logic circuitry is configured to receive said processed data streams in a third time-sliced schedule, wherein each time slice of said third time-sliced schedule comprises a respective predetermined number of clock cycles;
a plurality of output buffers coupled to said processing logic circuitry, wherein each output buffer is configured to:
store valid words in processed packet data units of a respective processed data stream;
supply valid words in processed packet data units to said down-stream logic circuitry in accordance with said third time-sliced schedule; and
produce disabled cycles to avoid buffer underflow.

17. A device for processing data fragments from a plurality of data streams, said device comprising:
logic circuitry configured to receive a plurality of data fragments from a plurality of data streams, wherein each of said data fragment is associated with a fragment boundary, and wherein each of said data fragment is carried in a corresponding data stream consecutive;
wherein said logic circuitry is further configured to, at an end of a time slice, transition to continuously processing a data fragment from a second data stream after continuously processing a data fragment from a first data stream in entirety, wherein said time slice as determined by a fragment boundary associated with said data fragment from said first data stream; and
wherein said logic circuitry is further configured to output processed data fragments, wherein: said processed data fragment comprises a plurality of processed words; each processed word corresponds to an input word in a corresponding data fragment; and each input word is associated with a channel identification and validity signals indicating validity of said input word, wherein a data fragment comprises a plurality of input words.

18. The device of claim 17, wherein said logic circuitry is further configured to continuously process another data fragment from said first data stream without using any state that is stored during continuously processing said data fragment from said first data stream, wherein said another data fragment succeeds said data fragment from said first data stream.

19. The device of claim 17, wherein said logic circuitry is further configured to select said second data stream for processing in accordance with a predetermined order.

20. The device of claim 17, wherein said plurality of data streams are transmitted by multiple communication channels of different bandwidths.

* * * * *